United States Patent
Kang et al.

(10) Patent No.: US 8,249,376 B2
(45) Date of Patent: Aug. 21, 2012

(54) APPARATUS AND METHOD OF RESTORING AN IMAGE

(75) Inventors: Joo-young Kang, Yongin-si (KR); Jae-guyn Lim, Yongin-si (KR); Seong-deok Lee, Suwon-si (KR); Hyun-wook Ok, Seoul (KR)

(73) Assignees: Samsung Electronics Co., Ltd., Suwon-Si (KR); Samsung Electro-Mechanics Co., Ltd., Suwon-Si (KR)

( * ) Notice: Subject to any disclaimer, the term of this patent is extended or adjusted under 35 U.S.C. 154(b) by 1162 days.

(21) Appl. No.: 12/081,497

(22) Filed: Apr. 16, 2008

(65) Prior Publication Data

US 2009/0067710 A1 Mar. 12, 2009

(30) Foreign Application Priority Data

Sep. 11, 2007 (KR) .................. 10-2007-0092238

(51) Int. Cl.
*G06K 9/40* (2006.01)
(52) U.S. Cl. .................................................. 382/255

(58) Field of Classification Search .............. 358/3.27, 358/532; 359/306, 560; 382/255, 279; 708/5, 708/315, 420, 813
See application file for complete search history.

(56) References Cited

U.S. PATENT DOCUMENTS

| | | | |
|---|---|---|---|
| 4,712,010 A * | 12/1987 | Alm | 250/334 |
| 5,128,748 A * | 7/1992 | Murakami et al. | 358/500 |
| 5,933,513 A * | 8/1999 | Yoneyama et al. | 382/106 |
| 6,252,993 B1 * | 6/2001 | Murayama | 382/242 |
| 7,672,527 B2 * | 3/2010 | Arenberg et al. | 382/255 |
| 2003/0139650 A1 * | 7/2003 | Homma | 600/181 |
| 2003/0189655 A1 | 10/2003 | Lim et al. | |
| 2006/0013479 A1 | 1/2006 | Trimeche et al. | |
| 2006/0034512 A1 | 2/2006 | Sheraizin et al. | |
| 2006/0093234 A1 * | 5/2006 | Silverstein | 382/255 |
| 2006/0115174 A1 | 6/2006 | Lim et al. | |

OTHER PUBLICATIONS

Leo Levi, Applied Optics, 1968, John Wiley & Sons, p. 409-410.*

* cited by examiner

*Primary Examiner* — Gregory F Cunningham
(74) *Attorney, Agent, or Firm* — Staas & Halsey LLP

(57) ABSTRACT

A method and apparatus for restoring an image. The method includes extracting predetermined channels from image data including a plurality of channels; and restoring the extracted channels using a first filter.

25 Claims, 9 Drawing Sheets

910

920

930

APPARATUS AND METHOD OF RESTORING AN IMAGE

CROSS-REFERENCE TO RELATED APPLICATIONS

This application claims priority from Korean Patent Application No. 10-2007-0092238 filed on Sep. 11, 2007, in the Korean Intellectual Property Office, the disclosure of which is incorporated herein by reference in its entirety.

BACKGROUND

1. Field

One or more embodiments of the present invention relate to an apparatus and method of restoring an image, and, more particularly, to an apparatus and method of restoring an image that is capable of extracting a specific channel having a high sharpness, and restoring an image using a specific filter.

2. Description of the Related Art

FIG. 1 is a diagram illustrating output of an RGB image according to the related art. As shown in FIG. 1, when light passes through a lens, the distance at which an image is formed on the basis of the lens depends on the refractive index of the lens. Therefore, light that has various wavelengths forms images at various locations. That is, the light is divided into an R channel, a G channel, and a B channel according to wavelengths, and in each channel, an image is formed at a different location. In particular, when the lens and a sensor are fixed at specific locations, a channel of an image, which is formed on the sensor, is changed according to the location of the subject. As a result, in at least one of R, G, and B channels, an image having the highest sharpness is formed on the sensor.

Accordingly, a technology is needed for generating an output image having a highest sharpness from an input image using the channel having the highest sharpness among R, G, and B channels on the basis of the above-described fundamental concept.

SUMMARY

One or more embodiments of the present invention provide an apparatus and method of restoring an image that is capable of extracting a channel having a highest sharpness from an input image and restoring the extracted channel through a first specific filter.

One or more embodiments of the present invention provide an apparatus and method of restoring an image that is capable of extracting a high frequency feature from a restored image, calculating a high frequency feature coefficient from the extracted high frequency feature, and restoring a luminance channel to generate an output image.

Additional aspects and/or advantages will be set forth in part in the description which follows and, in part, will be apparent from the description, or may be learned by practice of the invention.

According to an aspect of the present invention, there is provided a method of restoring an image, including extracting predetermined channels from image data including a plurality of channels and restoring the extracted channels using a first filter.

According to another aspect of the present invention, there is provided an apparatus for restoring an image, including an image input unit extracting predetermined channels from image data including a plurality of channels and an image-restoring unit restoring the extracted channels using a first specific filter.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
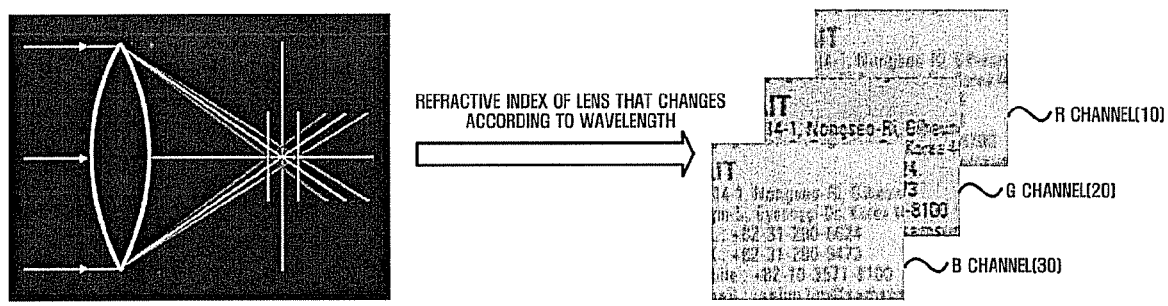
FIG. 1 is a diagram illustrating an image that is output for each of the R, G, and B channels according to the related art.

Reference will now be made in detail to the embodiments, examples of which are illustrated in the accompanying drawings, wherein like reference numerals refer to the like elements throughout. The invention may, however, be embodied in many different forms and should not be construed as being limited to the embodiments set forth herein.

Figure 2:
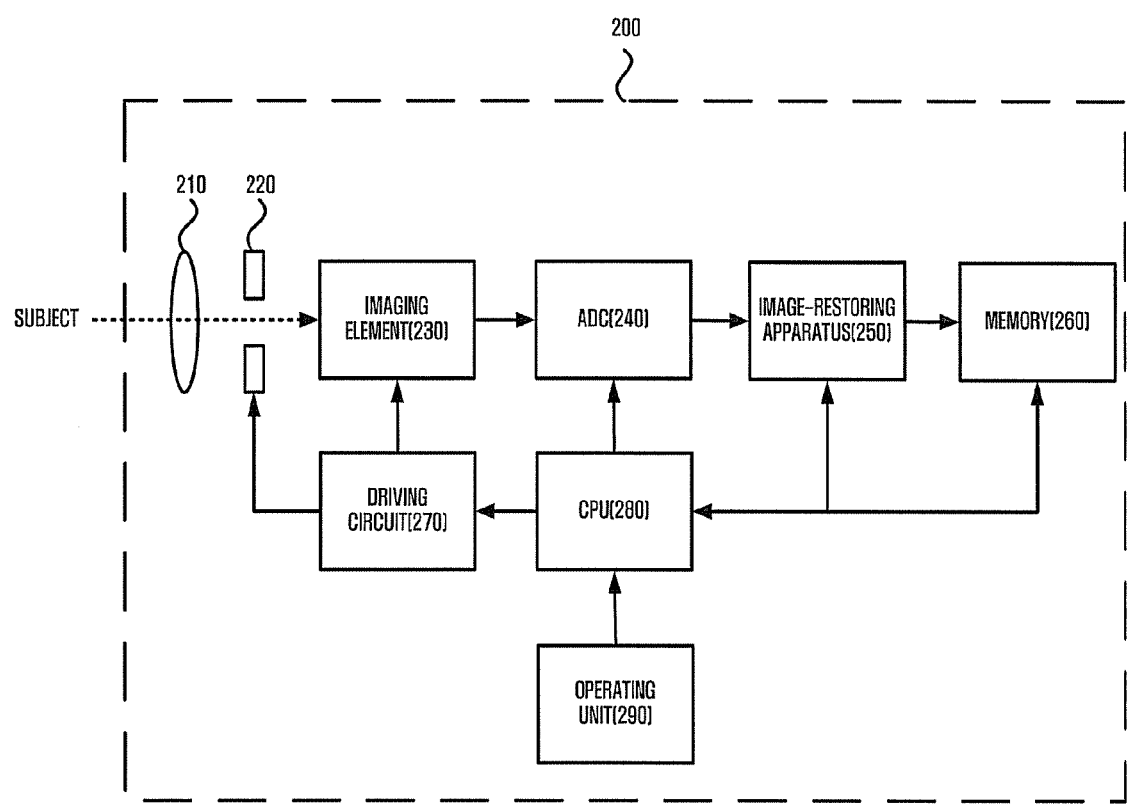
FIG. 2 is a block diagram illustrating a structure of an image-capturing system according to an embodiment of the invention.

FIG. 2 is a block diagram illustrating a structure of an image-capturing system according to an embodiment of the invention.

An image-capturing system 200 according to an embodiment of the invention includes a lens 210, an aperture 220, an imaging element 230, an ADC (Analog-to-Digital Converter) 240, an image-restoring apparatus 250, a memory 260, a driving circuit 270, a CPU (Central Processing Unit) 280, and an operating unit 290.

Image light that is obtained from a subject is incident on the imaging element 230 through the lens 210 and the aperture 220. The imaging element 230 may be composed of a CCD, a CMOS, or image-capturing units that are known by those skilled in the art. An analog signal of an image, which is formed on an imaging surface of the imaging element 230, is converted into an original digital image signal by the ADC 240. The converted digital image signal is input to the image-restoring apparatus 250 according to the embodiment of the invention. The image-restoring apparatus 250 processes the input image signal and improves the quality of the output image. The image-restoring apparatus 250 will be described in detail with reference to FIG. 3.

The image that is processed by the image-restoring apparatus 250 is stored in the memory 260. For example, the memory 260 may be implemented by a non-volatile memory element, such as a ROM, a PROM, an EPROM, an EEPROM, and a flash memory, a volatile memory element, such as a RAM, or a storage medium, such as a hard disk or an optical disk.

A signal that is output from the operating unit 290 is input to the CPU 280 for system control, and a control signal that is output from the CPU 280 is input to the image-restoring apparatus 250 or the memory 260. As a result, recording of the image that is corrected by the image-restoring apparatus 250 is controlled. Further, the CPU 280 applies a control signal to the driving circuit 270 that controls the aperture 220 or an exposure time (shutter speed) in the imaging element 230 or an AGC (Auto Gain Control) (not shown).

Figure 3:
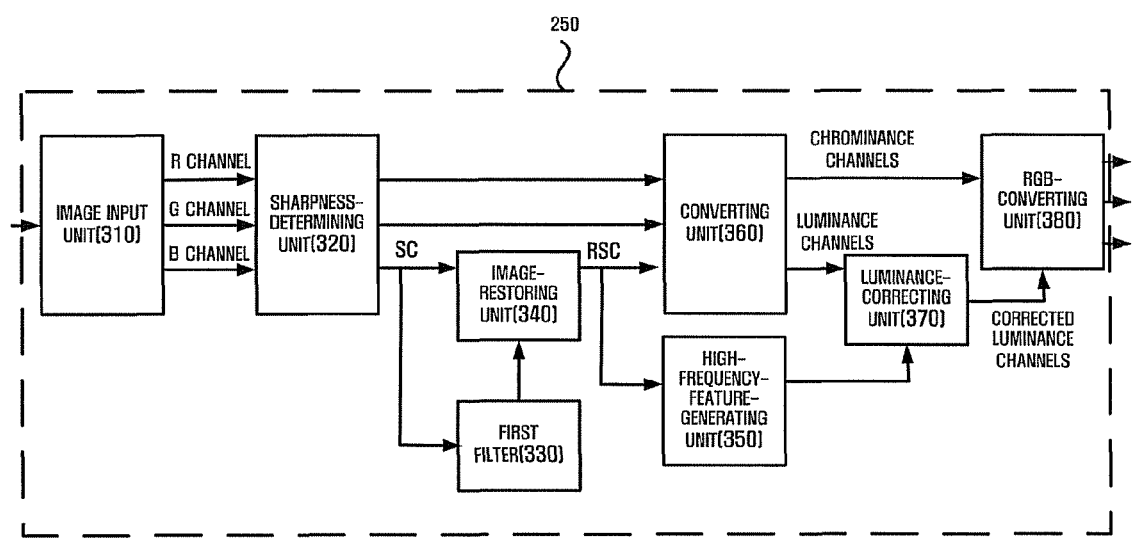
FIG. 3 is a block diagram illustrating an image-restoring apparatus 250 of an image-capturing system 200.

FIG. 3 is a block diagram illustrating a structure of an image-restoring apparatus 250 according to an embodiment of the present invention. Herein, in the present application, the term apparatus should be considered synonymous with the term system, and not limited to a single enclosure or all described elements embodied in single respective enclosures in all embodiments, but rather, depending on embodiment, is open to being embodied together or separately in differing enclosures and/or locations through differing elements, e.g. a respective apparatus/system could be a single processing element or implemented through a distributed network, noting that additional and alternative embodiments are equally available.

Referring to FIG. 3, the image-restoring apparatus 250 can operate as a component of the image-capturing system 200, as shown in FIG. 2, but the invention is not limited thereto. The image-restoring apparatus 250 may function as an independent apparatus, and operate in a state where it is mounted in a computer, a PDA (Personal Digital Assistant), a PMP (Portable Multimedia Player), a cellular phone, or the like. Specifically, the image-restoring apparatus 250 may include an image input unit 310, a sharpness-determining unit 320, a first filter 330, an image-restoring unit 340, a high-frequency-feature-generating unit 350, a converting unit 360, a luminance-correcting unit 370, and an RGB-converting unit 380.

The image input unit 310 receives an image that is stored in a predetermined memory. At this time, the image input unit 310 may separate the received image into each of its channels (for example, for RGB). This is possible because in general, an image does not include a single component but three-dimensional components.

Figure 5:
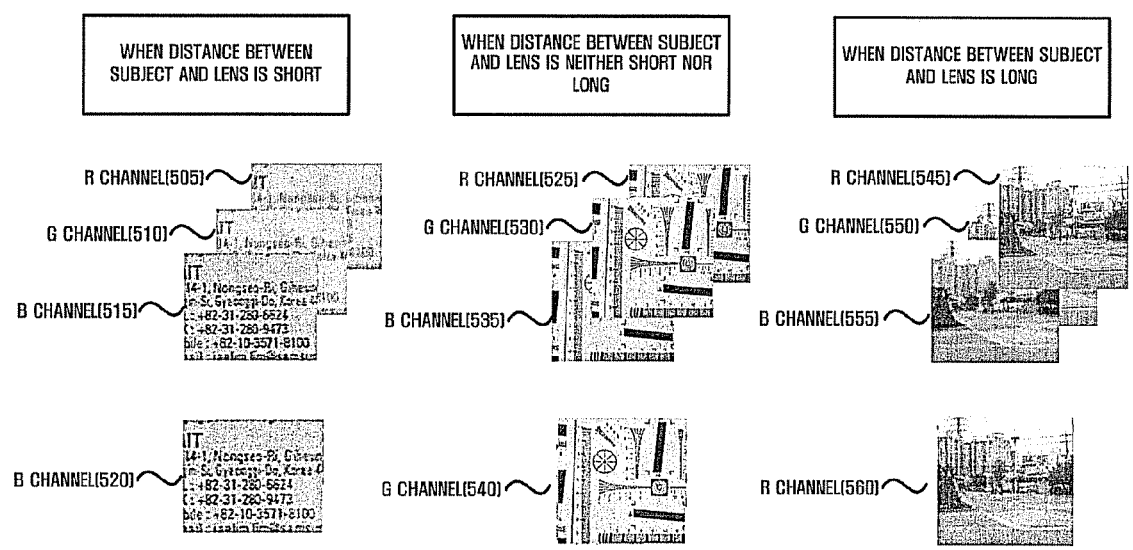
FIG. 5 is a diagram illustrating a state where an input image is separated for each of R, G, and B channels in accordance with an embodiment of the invention.

FIG. 5 is a diagram illustrating a state where an input image is separated for each of the R, G, and B channels in accordance with an embodiment of the invention. Referring to FIG. 5, the input image is separated into each of an R channel, a G channel, and a B channel or corresponding color component images according to wavelengths. If the distance between the subject and the lens is short, the sharpness is generally highest in a B channel 515 among the R, G, and B channels. If the distance between the subject and the lens is neither short nor long, a sharpness is generally highest in a G channel 530 among the R, G, and B channels. If the distance between the subject and the lens is long, the sharpness is generally highest in the R channel 545.

Referring to FIG. 3 back, the sharpness-determining unit 320 receives the R, G, and B channels or corresponding color components that are separated by the image input unit 310, and determines a channel having a highest sharpness in consideration of the distance between the lens and the subject.

In the present embodiment, using a high pass filter, the sharpness-determining unit 320 detects edge strength (that is, a high frequency feature) for each of the R, G, and B channels from the input image. If the edge strength is detected, each blur degree can be known, which enables a sharpness of each channel to be known. Accordingly, if the edge strength is measured for each of the channels, it is possible to know which channel has the highest sharpness among the channels.

As described above, the high pass filter passes a signal that has a frequency higher than a cutoff frequency (boundary frequency between a pass band and an attenuation band) without attenuation, but attenuates a signal that has a frequency lower than the cutoff frequency. Accordingly, since the edge of the signal waveforms that has a high frequency feature has a frequency higher than the cutoff frequency, the corresponding signal can pass through the high pass filter. As one example of the high pass filter, a Laplacian filter may be used.

The first filter 330 receives a channel that has the highest sharpness from the sharpness-determining unit 320. In consideration of the distance between the lens and the subject and the wavelength, the first filter 330 determines a corresponding specific filter.

In general, the specific filter may use an experimental method and an assumptive method. Examples of the experimental method may include a method using the distance from a specific variable, and a method using a sigma value of a Gaussian blur filter. Examples of the assumptive method may include a method of estimating a point spread function.

In the present embodiment, the method of estimating a point spread function is used. The method of estimating a point spread function will now be described in brief.

First, a point spread function that corresponds to an effective value indicating a blur level is estimated. Preferably, the effective value is compared with effective values of images that are photographed at different distances, the distance between a lens matched with the corresponding effective value and the subject (it may include the distance between an image sensor and the subject) is calculated, and a channel, in which a sharpness according to the calculated distance is highest and a point spread function corresponding to the channel are estimated.

In order to estimate a point spread function (PSF) that corresponds to the effective value, the image-restoring apparatus according to the embodiment of the invention can use the effective values of images that are photographed at different distances. It is preferable to use a graph or a table that shows a relation between the effective values obtained from images repetitively photographed at different distances off-line and the distance between the subject and the image sensor. That is, it is possible to experimentally calculate the distance between the subject matched with the effective value and the image sensor.

As described above, the image-restoring unit 340 generates a restored image channel from the channel having the highest sharpness using a specific filter.

In the present embodiment, according to the image-restoring apparatus, the image-restoring unit 340 applies a convolution filter to the point spread function and removes a blur, thereby restoring an image or improving sharpness. In general, a Wiener filter, a Lucy-Richardson filter, or the like is used as a convolution filter that is applied to a given point spread function to remove the blur.

For example, the Wiener filter $H_w$ is defined by the following Equation 1.

$$H_w(u, v) = \frac{D^*(u, v)}{D^*(u, v)D(u, v) + \frac{S_n(u, v)}{S_i(u, v)}} \quad \text{Equation 1}$$

In this case, u and v denote two coordinate components in a frequency domain, D(u, v) denotes a PSF whose refined PSF is converted into the frequency domain, and D*(u, v) denotes the conjugate of D(u, v). $S_n$(u, v) denotes a power spectrum of a noise, and $S_i$(u, v) denotes a power spectrum of an ideal image. If the Wiener filter is applied to a region of an image on the basis of pixels the Wiener filter $H_w$ filters and a convolution between the Wiener filter $H_w$ and the region of the image (total sum of products between the corresponding values) is calculated, and the pixels are filtered. As a result, a pixel value (a deblurred result) is calculated.

Figure 6:
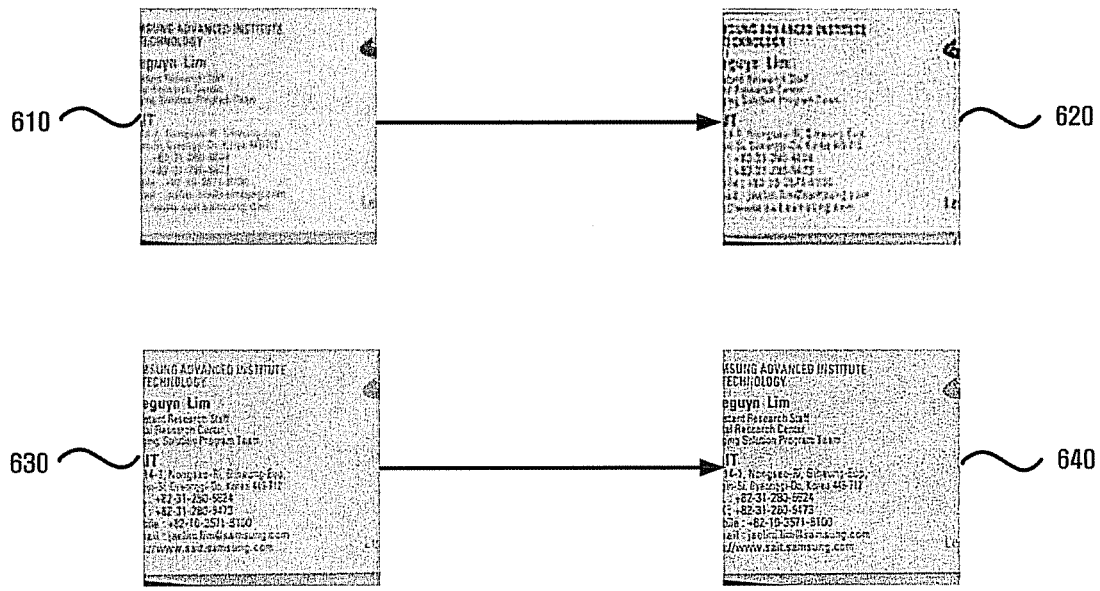
FIG. 6 is a diagram illustrating a difference in sharpness between restored images according to an embodiment of the invention.

FIG. 6 is a diagram illustrating a difference in sharpness between restored images in accordance with an embodiment of the invention. Referring to FIG. 6, if the distance between the lens and the subject is short, a sharpness is generally highest in the B channel. If the R channel 610 having a low sharpness is restored, a restored image 620 having a low sharpness is shown. In contrast, if the B channel 630 having a high sharpness is restored, a restored image 640 having a high sharpness is shown. In this way, the channel having the highest sharpness is determined and restored or has its sharpness improved.

The restored image channels and the blur channels (channels among the R, G, and B channels, except for the channel having the highest sharpness) are transmitted to the converting unit 360. However, the restored image channels are transmitted to the high-frequency-feature-generating unit 350 and the converting unit 360.

The high-frequency-feature-generating unit 350 generates a high frequency feature from the received restored image channels. In this case, the high frequency feature includes an edge value or the like. A Sobel mask method is generally used when the high frequency feature is detected from the restored image.

Figure 7:
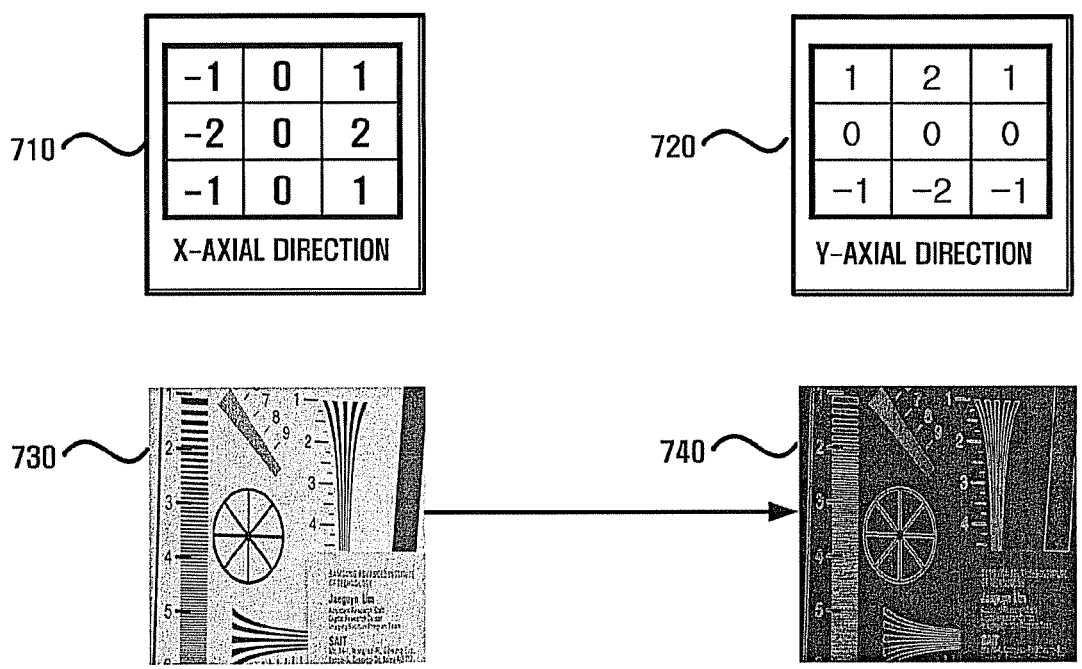
FIG. 7 is a diagram illustrating an image that is generated by extracting a high frequency feature from a restored image in accordance with an embodiment of the invention.

FIG. 7 is a diagram illustrating an image that is generated by extracting a high frequency feature from a restored image in accordance with an embodiment of the invention. Referring to FIG. 7, an x-axial direction mask 710 and a y-axial direction mask 720 exist. A mask of 3×3 is applied to pixels of 3×3 on the basis of a specific pixel. Components of the mask of 3×3 and the corresponding pixels of 3×3 are respectively multiplied and are summed up. The calculated sum can be calculated for each of the x-axial direction mask and the y-axial direction mask. It is assumed that the two obtained sums are $S_x$ and $S_y$. In this case, if any one of the two obtained sums $S_x$ and $S_y$ exceeds a predetermined threshold value, it is determined that a pixel at a central location is located at an edge of an image. For example, if the sum $S_x$ of a certain pixel exceeds the threshold value, the pixel belongs to an edge in an x-direction, and if the sum $S_y$ of a certain pixel exceeds the threshold value, the pixel belongs to an edge in a Y direction. An image 740 of the high frequency feature that is extracted from an original image 730 by using a Sobel filter is shown in FIG. 7.

A correlation between the high frequency feature value and the high frequency feature coefficient, which is estimated by using the Sobel filter, can be represented, for example, by Equation 2 using accumulated data.

$$\partial = 1 - \exp\left(-\frac{\text{(high frequency feature value)}^2}{\beta}\right) \quad \text{Equation 2}$$

In Equation 2, the high frequency feature coefficient $\partial$ has a correlation with the high frequency feature value and a value of a parameter $\beta$. When a user arbitrarily changes the value of the parameter $\beta$, the high frequency feature coefficient $\partial$ is changed. The sharpness of the restored luminance channel is determined according to the changed high frequency feature coefficient, which will be described in detail below.

Figure 8:
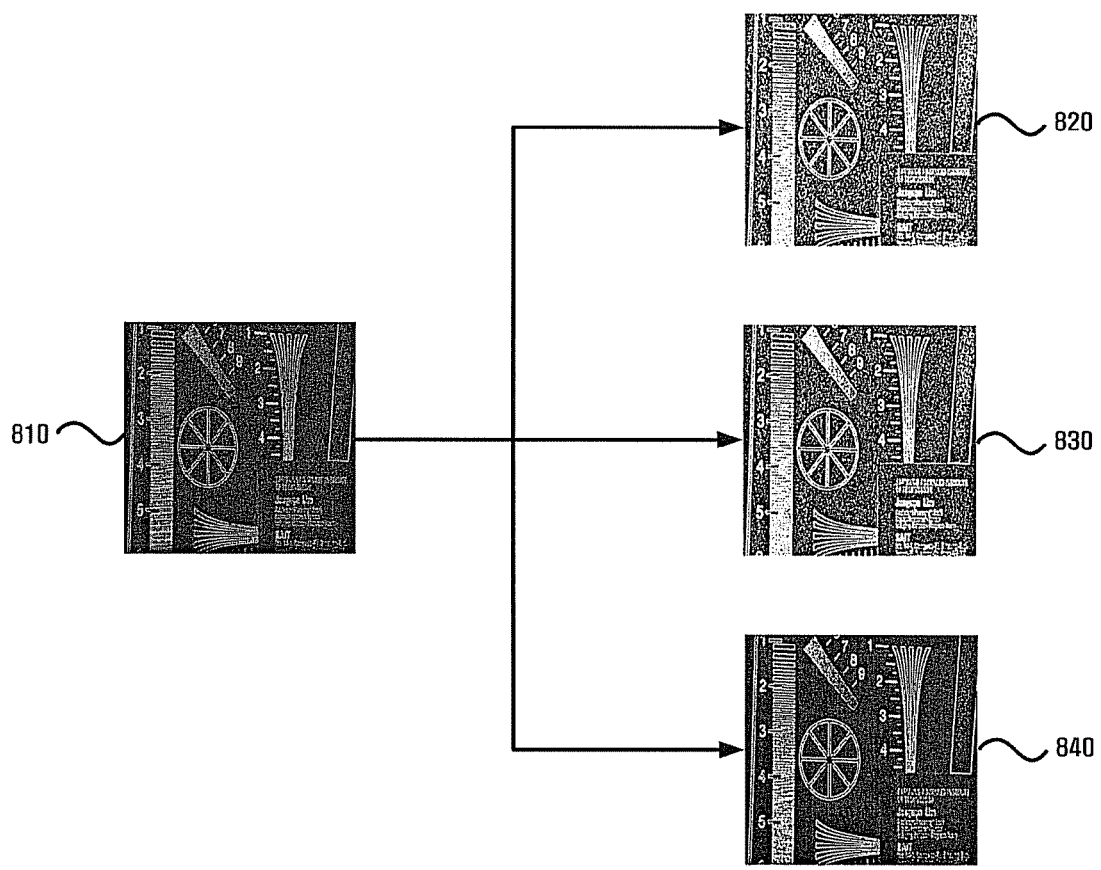
FIG. 8 is a diagram illustrating a changed high frequency feature according to a change in a high frequency feature coefficient according to an embodiment of the invention.

FIG. 8 is a diagram illustrating a changed high frequency feature of an initial high frequency feature 810 according to a change in a high frequency feature coefficient according to an embodiment of the invention. Referring to FIG. 8, the user can arbitrarily change the value of the parameter $\beta$, and when the value of the parameter $\beta$ is decreased, the value of the high frequency feature coefficient 820 is increased. Accordingly, the high frequency feature value has a large value in the high frequency feature coefficient 820. In contrast, when the user increases the value of the parameter $\beta$, the value of the high frequency feature coefficient 840 is decreased. An intermediate value of the high frequency feature coefficient 830 is also shown.

As described above, the specified high frequency feature coefficient becomes a parameter of the luminance-correcting unit 370, and a specific high frequency feature coefficient having an optimal sharpness is determined by using a database that is accumulated through various experiments.

Referring to FIG. 3 again, the converting unit 360 separates chrominance channels and luminance channels from blur channels and restored image channels that have been transmitted from the sharpness-determining unit 320. The separated luminance channels are transmitted to the luminance-correcting unit 370 and the chrominance channels are transmitted to the RGB-converting unit 380.

The luminance-correcting unit 370 can correct the luminance channels transmitted from the converting unit 360 by using the high frequency feature and the high frequency feature coefficient transmitted from the high-frequency-feature-generating unit 350. A method in which the luminance-correcting unit 370 corrects the luminance channels is not limited to the following embodiment.

In one or more embodiments of the present invention, a luminance channel Y, a restored image C', and a high frequency feature coefficient $\partial$ have correlations that are represented below, for example, by Equations 3 and 4, and generate a restored luminance channel Y'.

$$Y' = \partial * C' + (1 - \partial) * Y \quad \text{Equation 3}$$

$$Y' = Y - \partial * Y + \partial * C' \quad \text{Equation 4}$$

In the present embodiments, if the luminance channel is corrected using the high frequency feature coefficient $\partial$, the existing luminance is maintained and color information is preserved in the low frequency feature. In the high frequency feature, a sharpness can be increased by inputting the restored image information and increasing the luminance.

Figure 9:
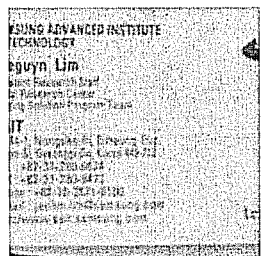
FIG. 9 is a diagram illustrating an input image, a restored image, and a luminance-corrected image according to an embodiment of the invention.
Figure 9:
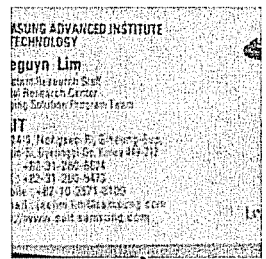
Figure 9:
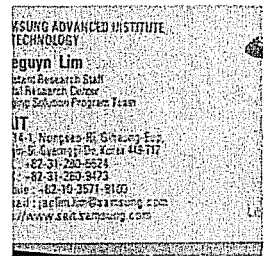

The image that is restored using Equations 3 and 4 will be described with reference to FIG. 9. FIG. 9 is a diagram illustrating an input image 910, a restored image 920, and a luminance-corrected image 930 according to an embodiment of the invention. Referring to FIG. 9, it can be understood from experiments that a luminance-corrected image 930 is clearer than an input image 910 and a restored image 920.

If the luminance image is corrected, the RGB-converting unit 380 changes the chrominance channels and the corrected luminance channels to R, G, and B channels and generates the changed output image.

Figure 4:
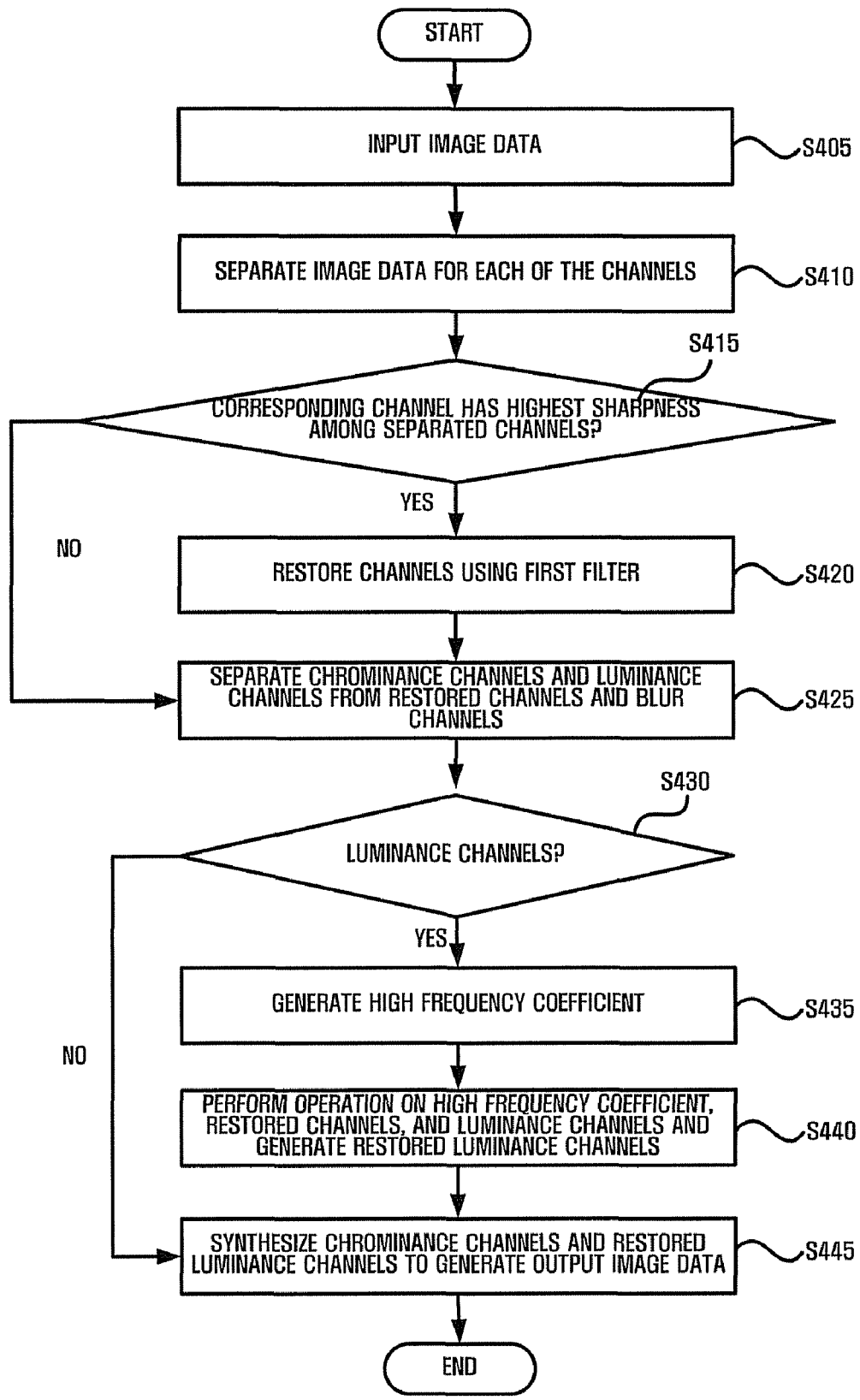
FIG. 4 is a flowchart illustrating a method of restoring an input image according to an embodiment of the invention.

FIG. 4 is a flowchart illustrating a method of restoring an image according to an embodiment of the invention.

Referring to FIG. 4, image data, which is stored in a predetermined memory or photographed by a device, such as a camera, is input S405.

If the image data is input, the image data is separated into each of its channels S410. The image data includes a plurality of channels, such as R, G, and B channels.

After the channels are separated, it is determined which channel or the channel is selected that has the highest sharpness among the separated channels S415. In the present embodiment, as described above, in order to determine which channel has the highest sharpness, edge strength is extracted by using a high pass filter and a blur degree is calculated from the extracted edge degree. In this way, it is possible to determine the channel having the highest sharpness.

After the channel having the highest sharpness is determined, the corresponding channel is restored or has its sharpness improved to modify the separated image by using the first filter S420. In the present embodiment, as described above, the first filter can use a filter that is applied to a point spread function, and if the distance and wavelength of the input image are determined, the point spread function can be determined.

If the point spread function is determined, a restored channel is formed from the channel having the highest sharpness using the first filter. In the present embodiment, as described above, the restored image is restored by using the first filter where the convolution filter is applied to the point spread function.

The chrominance channels and the luminance channels are separated from the restored channels and the blur channels S425. If the separated channels are the luminance channels S430, the high frequency feature is generated by using the second specific filter S435, as described above. In the present embodiment, the second specific filter includes a Sobel filter or the like. After the high frequency feature value (that is, edge value) is extracted, the user uses the value of $\beta$ as a parameter and defines the correlation between the high frequency feature value and the high frequency feature coefficient $\partial$ using the above-described Equation 2. Accordingly, if the value of the parameter $\beta$ is adjusted, the high frequency feature coefficient value is changed. A variety of restored image luminance channels are generated according to the high frequency feature coefficient value S440. If the changed high frequency feature coefficient value according to the value of the parameter $\beta$ is generated, the restored chrominance channel is generated by operating the high frequency coefficient, the restored channel, and the luminance channel S445. As described above. In the present embodiment, Equations 3 and 4 can be used, and the corresponding luminance channels can be corrected. If the corresponding channels are not the luminance channels S430, the process proceeds to S445.

If the luminance channel is corrected, the chrominance channel and the restored luminance channel are synthesized, and the output image data is generated S450 and can be displayed on a display. The corresponding channels are converted into the R, G, and B channels that are the same channels as the input images, and the output images are generated and further, the output images can be combined. As described above, the output images are shown in FIG. 9. From FIG. 9, the difference of the sharpness between the images can be appreciated.

In addition to the above described embodiments, embodiments of the present invention can also be implemented through computer readable code/instructions in/on a medium, e.g., a computer readable medium, to control at least one processing element to implement any above described embodiments and display the resultant image on a display. The medium can correspond to any medium/media permitting the storing and/or transmission of the computer readable code.

The computer readable code can be recorded on a recording medium in a variety of ways, with examples including magnetic storage media (e.g., ROM, floppy disks, hard disks, etc.) and optical recording media (e.g., CD-ROMs, or DVDs). The computer readable code can also be transferred on transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of restoring an image, comprising:
   extracting a channel with a highest sharpness from image data including a plurality of channels;
   determining a first specific filter responsive to the channel having the highest sharpness; and
   improving sharpness of the extracted channels using the first specific filter.

2. The method of claim 1, wherein:
   the plurality of channels include an R channel, a G channel, and a B channel, and
   the R, G, and B channels are separated from each other according to the wavelength of the light.

3. The method of claim 1, wherein the first specific filter includes a convolution filter to which a point spread function is applied.

4. The method of claim 1, further comprising:
   converting the restored channels and additional ones of the plurality of channels into chrominance channels and luminance channels.

5. The method of claim 4, wherein the additional ones of the plurality of channels include the plurality of channels, exempting the channel having the highest sharpness.

6. A method of restoring an image, comprising:
   extracting predetermined channels from image data including a plurality of channels;

determining a channel with a highest sharpness;
determining a first specific filter responsive to the channel having the highest sharpness;
restoring the extracted channels using the first specific filter;
converting the restored channels and additional ones of the plurality of channels into chrominance channels and luminance channels
generating a high frequency feature value from the restored channels using a second specific filter;
generating a high frequency feature coefficient using the high frequency feature value and a specific variable; and
performing an operation on the restored channels, the high frequency feature coefficient, and the luminance channels and restoring the luminance channels.

7. The method of claim 6, wherein:
the second specific filter includes a Sobel filter, and
the Sobel filter extracts the high frequency feature value for each direction.

8. The method of claim 6, wherein:
the high frequency feature coefficient ∂, is represented by the equation $$\partial = 1 - \exp\left(-\frac{(\text{high frequency feature value})^2}{\beta}\right),$$

where β is a variable, and
the high frequency feature coefficient changes when the value of β changes.

9. The method of claim 6, wherein the operation uses the equation $$Y' = \partial * C' + (1-\partial) * Y,$$

where Y is one of the luminance channels, ∂ is the high frequency feature coefficient, C' is one of the restored channels, and Y' is one of the restored luminance channels.

10. The method of claim 6, wherein the operation uses the equation $$Y' = Y - \partial * Y + \partial * C',$$

where Y is one of the luminance channels, ∂ is the high frequency feature coefficient, C' is one of the restored channels, and Y' is one of the restored luminance channels.

11. The method of claim 6, further comprising:
synthesizing the restored luminance channels and the chrominance channels to generate output image data.

12. An apparatus for restoring an image, comprising:
an image input unit extracting a channel with a highest sharpness from image data including a plurality of channels;
a filter unit determining a first specific filter responsive to the channel having the highest sharpness; and
an image-restoring unit improving sharpness of the extracted channels using the first specific filter.

13. The apparatus of claim 12, wherein:
the plurality of channels include an R channel, a G channel, and a B channel, and
the R, G, and B channels are separated from each other according to the wavelength of the light.

14. The apparatus of claim 12, wherein the first specific filter includes a convolution filter to which a point spread function is applied.

15. The apparatus of claim 12, further comprising:
a converting unit converting the restored channels and additional ones of the plurality of channels into chrominance channels and luminance channels.

16. The apparatus of claim 15, wherein the additional ones of the plurality of channels include the plurality of channels, exempting the channel having the highest sharpness.

17. An apparatus for restoring an image, comprising:
an image input unit extracting predetermined channels from image data including a plurality of channels;
a channel unit determining a channel with a highest sharpness;
a filter unit determining a first specific filter responsive to the channel having the highest sharpness;
an image-restoring unit restoring the extracted channels using a first specific filter;
a converting unit converting the restored channels and additional ones of the plurality of channels into chrominance channels and luminance channels;
a high-frequency-feature-generating unit extracting a high frequency feature value from the restored channels using a second specific filter and generating a high frequency feature coefficient using the high frequency feature value and a specific variable; and
a luminance-correcting unit performing an operation on the restored channels, the high frequency feature coefficient, and the luminance channels and correcting the luminance channels.

18. The apparatus of claim 17, wherein:
the second specific filter includes a Sobel filter, and
the Sobel filter extracts the high frequency feature value for each direction.

19. The apparatus of claim 17, wherein:
the high frequency feature coefficient ∂, is represented by the equation $$\partial = 1 - \exp\left(-\frac{(\text{high frequency feature value})^2}{\beta}\right),$$

where β is a variable, and
the high frequency feature coefficient changes when the value of β changes.

20. The apparatus of claim 17, wherein the operation uses the equation $$Y' = \partial * C' + (1-\partial) * Y,$$

where Y is one of the luminance channels, ∂ is the high frequency feature coefficient, C' is one of the restored channels, and Y' is one of the restored luminance channels.

21. The apparatus of claim 17, wherein the operation uses the equation $$Y' = Y - \partial * Y + \partial * C',$$

where Y is one of the luminance channels, ∂ is the high frequency feature coefficient, C' is one of the restored channels, and Y' is one of the restored luminance channels.

22. The apparatus of claim 17, further comprising: an RGB-restoring unit synthesizing the restored luminance channels and the chrominance channels to generate output image data.

23. A non-transitory computer readable recording medium having embodied thereon a computer program to control a computer to execute the method of claim 1.

24. A method of restoring an image, comprising: separating image data into color component images; selecting one of the color component images that has a highest sharpness; modifying the selected color component image data with the highest sharpness to improve sharpness using a filter; and combining the selected color component image data with the improved sharpness with the non-selected ones of the color component images.

25. A restored image displayed on a display, comprising: a first color component image data; and a second color component image data having a higher sharpness than the first color component image data, having an improved sharpness relative to an original of the second color component image data by using a filter and being combined with the first color component image data.

* * * * *

UNITED STATES PATENT AND TRADEMARK OFFICE
CERTIFICATE OF CORRECTION

| | |
|---|---|
| PATENT NO. | : 8,249,376 B2 |
| APPLICATION NO. | : 12/081497 |
| DATED | : August 21, 2012 |
| INVENTOR(S) | : Joo-young Kang et al. |

Page 1 of 1

It is certified that error appears in the above-identified patent and that said Letters Patent is hereby corrected as shown below:

Column 8, Line 48, In Claim 1, delete "channels" and insert -- channel --, therefor.
Column 9, Line 8, In Claim 6, after "channels" insert -- ; --.
Column 9, Line 59, In Claim 12, delete "channels" and insert -- channel --, therefor.

Signed and Sealed this
Twentieth Day of November, 2012

David J. Kappos
*Director of the United States Patent and Trademark Office*